United States Patent Office 2,913,490
Patented Nov. 17, 1959

2,913,490

THERMAL DEGRADATION OF RICINOLEATES

Werner Stein, Dusseldorf-Holthausen, Germany, assignor to Henkel & Cie. G.m.b.H., Dusseldorf-Holthausen, Germany, a corporation of Germany No Drawing. Application March 6, 1957
Serial No. 644,216

Claims priority, application Germany March 23, 1956

10 Claims. (Cl. 260—537)

This invention relates to new and useful improvements in the thermal degradation of ricinoleates.

Commercially valuable sebacic acid and oxydecanoic acid are obtained by the thermal degradation of ricinoleates. The thermal degradation is effected by heating an alkali salt of ricinoleic acid in the presence of an excess of alkali which results in the formation of the sebacic or oxydecanoic acid salts. The heating is generally effected within the range of 150 to 350° C. with temperatures between 150 to 200 resulting in the formation of the oxydecanoic acid salts or temperatures between about 200 and 360, and preferably about 270 to 330, result in the formation of the sebacic acid salt. The degradation reaction may be facilitated with an increase in the reaction velocity by using cadmium, lead, bismuth, or thallium in the form of the metals, their compounds of alloys as catalysts. The heating is generally effected at a pressure at least as high as the vapor pressure of water at the reaction temperature and the crude reaction product is obtained in the form of the alkali salts from which the free acid may be separated by the addition of stronger acids. Fractional precipitation may also be used to effect separation from the salts of monobasic carboxylic acids present in the reaction product.

While attempts have been made to effect the reaction continuously, the same have not met with success since, if the water content of the reaction mixture is maintained within the region of the optimum limits of the reaction, the same is only capable of flowing at high temperature and solidifies upon cooling into a thickly viscous to solid mass, as a result of which the conduits, pressure reduction apparatus, etc. become clogged, particularly in the case of temperature variations causing operational difficulties.

One object of this invention is to overcome the above mentioned difficulties and thus to allow a practical method for continuous operation. This, and still further objects will become apparent from the following description.

In accordance with the invention it has been found that these difficulties can be overcome if the still hot reaction product, which upon cooling would solidify into a viscous solid mass which is difficult to convey, is diluted after the completion of the reaction but prior to the pressure reduction, with a sufficient quantity of water so that the reaction product will be readily flowable even at lower temperatures, as for example normal or room temperatures. The reaction product obtained in this manner can then be subject to the pressure reduction and worked up in the conventional manner without any difficulty.

The reaction, i.e. the thermal decomposition or degradation of the ricinoleates, is effected in the conventional and well known manner.

The starting ricinoleates are used in the form of aqueous alkali salts of ricinoleic acid which can be prepared in any desired manner. For this purpose, free ricinoleic acid can be neutralized with aqueous alkalis or solid, substantially water-free soaps of ricinoleic acid can be treated with the necessary quantities of water. It is also possible to react derivatives of ricinoleic acid, and in particular castor oil, with aqueous alkalis which are not excessively dilute to form water-containing ricinoleates. This latter reaction can be combined in one operation with the alkali cleavage by forcing the castor oil and aqueous alkali solution into the reaction vessel under pressure so that the saponification of the castor oil initially takes place and thereupon the alkali cleavage of the ricinoleate occurs.

The quantity of alkali present in the reaction mixture should be 1.0 to 7 times and preferably 1.2 to 4 times the quantity stoichiometrically required for the alkali cleavage. Stoichiometrically, 1 mol of alkali hydroxide per mol of alkali ricinoleate is required for the formation of sebacic acid salts. For the formation of oxydecanoic acid salts, alkali hydroxide is not necessary, but may be employed in excess of the alkali bound in the ricinoleate.

The water content of the reaction batch must be at least large enough that the quantity of water necessary stoichiometrically for the cleavage of the ricinoleate is present. This quantity is 1 mol of water per mol of ricinoleate. However, it is also possible to employ larger quantities of water of for instance 10–30% by weight of the reaction batch. More than 50% by weight of water in the reaction batch should not be used. These water contents refer to the reaction batch consisting of the ricinoleate, alkali hydroxide and possibly catalyst. If, in accordaince with German Patent 880,293 and United States Patent 2,696,500, soaps which are liquid at the reaction temperatures selected, are added to the reaction batch for liquefaction, these substances which do not in themselves take part in the splitting of the ricinoleates are not to be taken into consideration when calculating the water content of the reaction batch. The quantity of the addition of such soaps depends on the desired liquefaction of the reaction batch but in general, is not more than 2 parts by weight of soap-forming fatty acid per part by weight of ricinoleic acid. It is preferable to operate within the range of 0.2–0.5 parts by weight of soap-forming fatty acid to 1 part by weight of ricinoleic acid.

Although the reaction is strongly influenced by cadmium, lead, bismuth and thallium which may be present both in metallic form and in chemically-bound form, the reaction may be carried out without these catalysts. If catalysts are employed, the quantity of catalyst may vary within wide limits. In general, the content does not exceed 5% by weight of metal in the reaction batch and preferably 0.05–2% by weight metal is used. However, when operating in reaction vessels which are lined on the inside with the catalytically active metals, the reaction batch may contain less additional catalyst or even no additional catalyst. In such cases, it is generally preferable for the reaction batch to contain 0.01 to 0.1% by weight of catalyst metal.

The catalyst metals can be used in free or bound form, for instance as metals, oxides, hydroxides, salts, complex salts, for instance as sulfites, sulfates, fluorides, chlorides, bromides, iodides, nitrates, nitrites, carbonates, phosphates, formates, acetates, stearates, oleates, ricinoleates, benzoates, phthalates, aryl and paraffinsulfonates, etc. It is also possible to add to the reaction mixture products obtained in metallurgical processes which contain catalytically active metals, for instance oxide mixtures obtained upon the blasting of copper alloys in a copper converter. The form in which the metals are added is unimportant for their catalytic activity, and there are preferably used free metals, their hydroxides, oxides or compounds which form oxides or hydroxides under the reaction conditions. These compounds are reduced in whole or in part to metal during the reaction, the metal precipitating in part on the walls of the reaction vessel. The catalytically active metals can also be employed in the form of their alloys with each other or with catalytically inactive metals, as described in copending application Serial No. 606,986, filed August 30, 1956.

The reaction temperatures are within the range of 150–360° C. In the preparation of oxydecanoic acid salts, temperatures of 150°–200° C. are used and in the preparation of sebacic acid salts temperatures between 200–360° C. and preferably 270–330° C. are used. It is advisable to produce from the start in the apparatus such a pressure, for instance by the forcing in of inert gas, that a boiling of the contents at the reaction temperature cannot occur. For this purpose, there can be employed a pressure which corresponds to the saturation pressure of water at the operating temperature. Since the water-vapor pressure above the reaction batch is less than the saturation pressure of the water at the same temperature, a boiling of the reaction batch will be dependably avoided.

The special feature of the method, in accordance with the present invention, consists in diluting the reaction product as it leaves the reaction zone, but at the latest before the pressure reduction and before any thickening which takes place upon cooling, with sufficient water that the mass remains easily flowable even after cooling to room temperature. The reaction product is generally diluted with at least the same quantity by weight of water and preferably 2–3 times its weight of water, which is added cold, for instance at room temperature, or hot, i.e. at temperatures up to the critical temperature. It is advisable after the addition to allow sufficient time for the mix with the water prior to the pressure reduction. This process can be aided by mechanical stirring or the production of turbulent flows on baffle plates in mixing chambers, or the like. The amount of water added should in all cases be great enough to ensure a flowability at temperatures of at least 20° C. preferably 100° C.

By the dilution of the reaction product, in accordance with the invention, technical difficulties which were inherent in the previous manner of operation and which prevented the realization of the continuous production of sebacic acid described in the literature are overcome. If, for instance, in the prior art process, due to a technical disturbance the conveying of the reaction material was stopped, the reaction product would cool down outside of the reaction zone and clog the lines and the remelting involved very great difficulties in view of the high temperatures.

As a result of the water which, in accordance with the invention, is fed to the hot reaction product which is still readily flowable, the solid components of the reaction product remain in solution even at low temperatures. The reduction of the pressure on the reaction product which is still under pressure can accordingly take place at temperatures which are below the boiling point of the liquids contained in the reaction product. In accordance with the previously known method, a very hot soap melt had to be reduced in pressure to normal pressure. With this there was necessarily connected a spontaneous evaporation of the water and a strong spray effect, both leading to many technical difficulties such as formation of a mist and a clogging of the pressure reduction lines connected behind same. The dissolving of the reaction product in excess water in order to recover the free sebacic acid was made difficult, in the known manner of procedure, by the lumping of the solid only slowly soluble reaction product and additional expenditure of energy by heating and stirring was necessary. Furthermore, the heat content of the reaction material was not utilized since due to the high heat of evaporation of the water, a considerable quantity of heat was lost upon the pressure reduction due to the evaporation of the water. In the case of the method of procedure, in accordance with the invention, on the other hand, the heat content of the reaction mass is used for heating the water fed to the reaction mass and is not removed unutilized by cooling or evaporation. While the operating temperature upon working up the reaction product was previously determined by its high melting temperature, the reaction product can now be conveyed at low temperatures, and hydrogen can be withdrawn without danger of clogging by sprayed reaction mass.

In addition to the sebacic acid, octanol-2 and fatty acids are also recovered. The sebacic acid is pure white and of high purity.

The following examples are given by way of illustration and not limitation.

The methods described in the examples were carried out as follows:

Castor oil and 50% caustic soda solution were pumped by means of metering pumps through a reaction coil of copper or nickel pipe located in a heating bath. The reaction coil, unless expressly stated otherwise, was cadmiumized, had a capacity of 1 liter in the case of Examples 1 to 3 and of 3.2 liters in Example 4 and was positioned in a heating bath of 320° C. Immediately after the emergence of the coil from the heating bath, there was fed to the reaction product by means of another metering pump, in a mixing chamber, 2 to 3 times as much water at room temperature. Part of the solution of the reaction products obtained in this manner was reduced in pressure and part conducted into a vessel which was under pressure and served as buffer and collector vessel. The reaction product was removed continuously or intermittently from same and worked up. Since the temperature of the solution was less than 100° C., no evaporation took place upon the reduction in the pressure. In the case of all the experiments described, at the start inert gas ($N_2$), at a pressure of 130 kg./cm.², was forced into the apparatus in order to prevent evaporation of the water from the reaction batch. The working up was effected by batch process. For this purpose, the solution of the reaction product obtained within a given period of time at about 60–90° C. was adjusted to a pH of about 6 by the addition of dilute inorganic acid. In this connection the octanone or octanol produced in the reaction, the fatty acid still present in the reaction mixture and any unreacted ricinoleic acid separated out as an oily layer. This layer was removed, washed with hot water at a pH of 6 and thus freed from traces of sebacic acid. The aqueous extracts, after being combined with the main quantity, were thereupon treated at about 80 to 100° C. with further inorganic acid and allowed to cool. The sebacic acid which separated out was removed by suction filtering after cooling, freed of excess inorganic acid and salt by washing with water and dried. The working up of the reaction product to oxydecanoic acid was effected in the same manner. If it is desired to recover the salts rather than the free acids, the aqueous solution of the salts is dried, possibly after removal of the fatty acids, by fractional acidification.

In the calculation of the yields, the fact was taken into consideration that the castor oil fatty acid, (i.e. the total of the fatty acids bound in an esterlike manner in the castor oil or obtained therefrom) consists only to about 85% by weight of ricinoleic acid

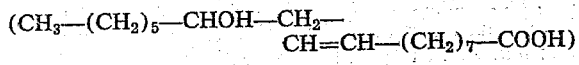

*Example 1*

Castor oil (containing 6.3% Cd-ricinoleate=1% Cd) and 50% caustic soda solution were continuously pumped through the apparatus in such a ratio that with a time of stay in the reaction coil of 20 minutes (including heating time) 469 grams castor oil and 410 cc. caustic soda solution were passed through. The working up of the reaction products obtained during an operating period of 20 minutes in the manner described gave 197 grams=76% of the theoretical amount of sebacic acid.

*Example 2*

In a manner similar to that employed in Example 1, there were worked up, with a time of stay of about 30 minutes, the reaction products formed during a continuous experiment from 550 grams castor oil and 440 cc. 50% caustic soda solution. There were obtained 232 grams sebacic acid=76% of the theoretical amount.

When carrying out the reaction without the addition of cadmium in a non-cadmiumized reaction coil, there were obtained upon working up 472 grams castor oil and 450 cc. of 50% caustic soda solution with a time of stay of 30 minutes, 159 grams sebacic acid=61% of the theoretical amount.

*Example 3*

From 533 grams castor oil and 420 cc. of 50% caustic soda solution, there were obtained in the same manner as in Example 1, with a time of stay of 60 minutes, 230 grams of sebacic acid=78% of the theoretical amount.

Upon operation without the addition of cadmium in the non-cadmiumized reaction coil, 185 grams sebacic acid=63% of the theoretical yield were obtained from 528 grams castor oil and 430 cc. 50% caustic soda solution with a time of stay of 60 minutes.

*Example 4*

From 1638 grams castor oil (containing 0.2% Cd in the form of cadmiumoleate) and 1440 cc. of 50% caustic soda solution, there were obtained, with a time of stay of 30 minutes, 657 grams sebacic acid=73% of the theoretical amount.

*Example 5*

50% caustic soda solution and castor oil fatty acid were pumped continuously into a mixing chamber provided with baffle plates so that the caustic soda solution and castor oil fatty acid were very intimately mixed with each other and formed a homogeneous soap. The mixture discharged from the mixing chamber into a cadmiumized nickel pipe coil of an inner diameter of 10 mm. and a total capacity of 4.3 liters, which was positioned in a heating bath of 320° C. The starting materials were pumped at such a rate through the apparatus that there was obtained a time of stay of 30 minutes. At the end of the reaction coil, there was a second mixing chamber into which water of a quantity of 2–3 times by weight the reaction product was pumped. An aqueous solution of the reaction products formed which contained in emulsified form the octanol which had been produced. The reaction product remained dissolved or dispersed even at room temperature so that no difficulties as a result of separation resulted upon the further working up. The product which was under a pressure of 100 kg./cm.$^2$ was subjected to pressure reduction. From a long period of operation, the quantity of substance worked in the course of 30 minutes was worked up for yield determination. During this period of time, 1,207 grams of a mixture of octanol and monocarboxylic acids and 945 grams of sebacic acid (acid number=550) equal to 77% of the theoretical yield were obtained from 2.4 liters castor oil fatty acid and 1.74 liters of 50% caustic soda solution.

*Example 6*

In the same manner as described in Example 5, 2.45 liters castor oil fatty acid and 1.9 liters 50% caustic soda solution were passed through the apparatus with a time of stay of 30 minutes. The removal of the product and of the hydrogen formed from the pressure apparatus was so adjusted that the pressure in the reaction vessel was 50 kg./cm.$^2$. Twice the quantity by weight of water was pumped to the reaction product which was under pressure after emergence from the reaction zone. With a time of stay of 30 minutes, 916=73% of the theoretical quantity of sebacic acid (acid number=550) was obtained from 45 liters of castor oil fatty acid and 1.9 liters caustic soda solution.

*Example 7*

In the same manner as in Example 5, 2.24 liters castor oil fatty acid and 1.89 liters of 50% caustic soda solution were passed through with a time of stay of 30 minutes; the pressure was set at 20 kg/cm.$^2$. Under these conditions, a part of the water forced into the reaction vessel evaporated. The reaction product obtained was treated under pressure with four times its quantity by weight of water, subjected to pressure reduction and conducted into a mixing trough of a length of 2½ meters and a capacity of 120 liters which was divided by partitions into five chambers. The chambers were connected with one another by overflows. The solution of the reaction product was treated during passage through the mixing trough with inorganic acid until a pH of 6 was obtained. The oil layer which formed was separated from the aqueous solution in a centrifuge. The aqueous solution was then treated in a second mixing trough with inorganic acid until a pH of 2 was obtained. In this connection, sebacic acid separated out which was filtered out on a revolving filter from the liquid and washed with water. The yield was 871 grams=75.5% of the theoretical yield.

The same experiment was carried out in an apparatus in which the reaction coil was replaced by another pipe provided with an agitator. The content of this reaction pipe was the same as in the case of the reaction coil; in front of and behind the reaction pipe there were located the above described mixing chambers. With the same time of stay, substantially the same results were obtained in this reaction vessel as when worked in the reaction coil.

I claim:

1. In the process for the degradation of ricinoleates in which an aqueous alkali salt of ricinoleic acid is heated under a pressure at least equal to the vapor pressure of water at the temperature at which said heating is effected and in which the reaction product formed is recovered after pressure reduction, the improvement which comprises diluting the hot reaction mixture prior to said pressure reduction with at least the same quantity by weight of water said amount of water being sufficient to maintain the reaction mixture readily flowable at temperatures of about 20° to 100° C.

2. Improvement according to claim 1, in which said dilution with an amount of water equal to about 2–5 times the weight of the reaction mixture.

3. Improvement according to claim 1 in which said heating is effected to a temperature between about 150 and 360° C.

4. In the continuous process for the degradation of ricinoleates in which an aqueous alkali salt of ricinoleic acid is heated under a pressure at least equal to the vapor pressure of water at the temperature at which said heating is effected and in which the reaction product formed is recovered after pressure reduction, the improvement which comprises diluting the hot reaction mixture prior to said pressure reduction with at least the same quantity by weight of water, said amount of water being sufficient to maintain the reaction mixture readily flowable at temperatures of about 20° to 100° C.

5. In the continuous process for the production of sebacic acid salts and sebacic acid in which an aqueous alkali salt of ricinoleic acid is heated to a temperature between about 200 and 360° C., at a pressure at least equal to the vapor pressure of water at said temperature in the presence of an excess of alkali and wherein the sebacic acid salt containing reaction product is recovered after pressure reduction and thereafter treated for the recovery of a member selected from the group consisting of sebacic acid and sebacic acid salts therefrom the improvement which comprises diluting the hot reaction product obtained by said heating prior to said pressure reduction with at least the same quantity by weight of water, said amount of water being sufficient to maintain the reaction product readily flowable at temperatures of about 20° to 100° C.

6. Improvement according to claim 5 in which said dilution is effected with about 2–5 times its weight in water.

7. Improvement according to claim 6 in which said heating is effected in the presence of up to 50% by weight of water.

8. Improvement according to claim 7 in which said heating is effected in the presence of about 10 to 30% by weight of water.

9. Improvement according to claim 5 in which said heating is effected in the presence of a catalyst for the conversion of the ricinoleic acid into the sebacic acid salt.

10. In the process for the production of sebacic acid salts and sebacic acid in which an aqueous alkali salt of ricinoleic acid is heated to a temperature between about 200 and 360° C. at a pressure at least equal to the vapor pressure of water at said temperature in the presence of an excess of alkali and in which the reaction product formed is recovered after pressure reduction and is treated for the recovery therefrom of a member selected from the group consisting of sebacic acid and sebacic acid salts, the improvement which comprises diluting the hot reaction product obtained by said heating prior to said pressure reduction with at least the same quantity by weight of water, said amount of water being sufficient to maintain the reaction product readily flowable at about room temperature.

References Cited in the file of this patent

UNITED STATES PATENTS

| | | |
|---|---|---|
| 2,182,056 | Bruson et al. | Dec. 5, 1939 |
| 2,696,500 | Stein | Dec. 7, 1954 |